United States Patent
Lavery et al.

(10) Patent No.: US 11,200,415 B2
(45) Date of Patent: Dec. 14, 2021

(54) DOCUMENT ANALYSIS TECHNIQUE FOR UNDERSTANDING INFORMATION

(71) Applicant: International Business Machines Corporation, Armonk, NY (US)

(72) Inventors: Andrew J. Lavery, Austin, TX (US); Fernando Jose Suarez Saiz, Armonk, NY (US); Richard J. Stevens, Monkton, VT (US); Eric L. Erpenbach, Oronoco, MN (US)

(73) Assignee: International Business Machines Corporation, Armonk, NY (US)

(*) Notice: Subject to any disclaimer, the term of this patent is extended or adjusted under 35 U.S.C. 154(b) by 246 days.

(21) Appl. No.: 16/545,891

(22) Filed: Aug. 20, 2019

(65) Prior Publication Data
US 2021/0056302 A1 Feb. 25, 2021

(51) Int. Cl.
| | |
|---|---|
| *G06F 40/20* | (2020.01) |
| *G06F 40/55* | (2020.01) |
| *G06F 40/279* | (2020.01) |
| *G06K 9/00* | (2006.01) |
| *G10L 15/183* | (2013.01) |
| *G06F 40/30* | (2020.01) |

(52) U.S. Cl.
CPC ......... *G06K 9/00463* (2013.01); *G06F 40/30* (2020.01); *G06K 9/00483* (2013.01); *G10L 15/183* (2013.01)

(58) Field of Classification Search
None
See application file for complete search history.

(56) References Cited

U.S. PATENT DOCUMENTS

| | | | |
|---|---|---|---|
| 6,026,388 A | * | 2/2000 | Liddy ............... G06F 16/3329 |
| 7,548,910 B1 | | 6/2009 | Chu et al. |
| 7,644,047 B2 | | 1/2010 | Assadian et al. |

(Continued)

OTHER PUBLICATIONS

Babakar et al., "The State of Automated Factchecking," Full Fact, Aug. 2016, pp. 1-31.

(Continued)

*Primary Examiner* — Marcellus J Augustin
(74) *Attorney, Agent, or Firm* — Robert A. Voigt, Jr.; Winstead PC

(57) ABSTRACT

A computer-implemented method, system and computer program product for understanding information using a document analysis technique. An initial corpus of information is formed by identifying a document(s) that match a search criteria. The initial corpus of information is expanded with a set of documents containing statements with a semantic meaning within a threshold degree of similarity to a semantic meaning of statements contained within the document(s) used to form the initial corpus of information. Viewpoint(s) are then extracted from the expanded corpus of information using a natural language processing technique. A new set of documents is analyzed by identifying the subject, assertion and context statements. Assertions in the new set of documents that are within a threshold degree of agreement or disagreement with the extracted viewpoint are highlighted to assist the user in understanding how information aligns with a viewpoint.

20 Claims, 3 Drawing Sheets

(56) References Cited

U.S. PATENT DOCUMENTS

| | | | | |
|---|---|---|---|---|
| 7,672,831 | B2* | 3/2010 | Todhunter | G06F 16/3329 |
| | | | | 704/4 |
| 9,189,540 | B2 | 11/2015 | Hailpern et al. | |
| 2005/0125216 | A1 | 6/2005 | Chitrapura et al. | |
| 2005/0203924 | A1* | 9/2005 | Rosenberg | G06F 16/338 |
| 2009/0048823 | A1 | 2/2009 | Liu et al. | |
| 2009/0112892 | A1* | 4/2009 | Cardie | G06F 16/93 |
| 2010/0063799 | A1* | 3/2010 | Jamieson | G06F 16/36 |
| | | | | 704/9 |
| 2018/0089568 | A1* | 3/2018 | Allen | G16H 70/60 |
| 2018/0336183 | A1* | 11/2018 | Lee | G06F 40/30 |

OTHER PUBLICATIONS

Childs, Morgan, "Could AI Fight Fake News? Yes—With the Help of Humans," Jul. 24, 2017, https://www.ibm.com/blogs/insights-on-business/ibmix/ai-fight-fake-news-yes-help-humans, pp. 1-4.

Marshall et al., "RobotReviewer: Evaluation of a System for Automatically Assessing Bias in Clinical Trials," Journal of Informatics in Health and Biomedicine, vol. 23, Issue 1, Jan. 2016, pp. 193-201.

Saiz, F. et al., "First Experiences with an AI-assisted Clinical Evidence System to Evaluate Clinical Consensus Among Clinical Trial Publications," Journal of Clinical Oncology, 2018, vol. 36, No. 15, e18583-e18583, http://ascopubs.org/doi/abs/10.1200/JCO.2018.36.15_suppl.e18583, Jun. 1, 2018, pp. 1-2.

Pang et al., "Opinion Mining and Sentiment Analysis," Foundations and Trends in Information Retrieval, http://dx.doi.org/10.1561/1500000011, vol. 2, Nos. 1-2, 2008, pp. 1-135.

Thomas Scholz, "Opinion Mining in Newspapers for a Media Response Analysis," Ph.D. Dissertation, Institut fur Informatik, Heinrich Heine Universitat Dusseldorf, Germany, Oct. 2013, pp. 1-164.

\* cited by examiner

DOCUMENT ANALYSIS TECHNIQUE FOR UNDERSTANDING INFORMATION

TECHNICAL FIELD

The present invention relates generally to document analysis, and more particularly to assessing agreement or disagreement of a corpus of documents with a viewpoint (e.g., school of thought).

BACKGROUND

Oftentimes, people may have different schools of thought concerning an issue, such as which treatment to use to treat a patient, which diet plan to use to lose weight, which approach to solve a technology problem, which materials to use in constructing a garage, etc. A school of thought is the perspective of a group of people who share common characteristics of opinion or outlook of a philosophy, discipline, belief, social movement, economics, cultural movement, art movement, etc. Each of these schools of thought, including contradictory schools of thought, may be valid to the extent that there is no consensus (or limited consensus) as to the correct approach for addressing the issue.

For example, there may be multiple schools of thought in how to treat a patient. For instance, there are many approaches, even those that contradict each other, that attempt to treat cancer. For example, some oncologists may subscribe to the school of thought that aggressive chemotherapy/radiation therapy is always better; whereas, other oncologists may subscribe to the school of thought that a more conservative approach using a less aggressive form of treatment to initially treat cancer is better.

Individuals may align themselves with a particular viewpoint (school of thought) and would like to check the validity of information based on such a viewpoint. For example, there are leading doctors who treat squamous cell lung cancer in a particular way. A physician may subscribe to one approach to treat squamous cell lung cancer based on research published by a particular doctor. As new information (e.g., new documents) becomes available about treating this type of lung cancer, the physician may want to see how the new information aligns with the physician's preferred expert's position.

Currently, document analysis techniques are limited to fact checking. In such techniques, statements in documents are compared against a generally agreed upon truth in order to determine the veracity or correctness of the statements. Unfortunately, such document analysis techniques do not analyze documents for determining how information in the documents aligns with a particular viewpoint.

SUMMARY

In one embodiment of the present invention, a computer-implemented method for understanding information using a document analysis technique comprises forming an initial corpus of information, where the initial corpus of information is established by identifying one or more documents that match a search criteria. The method further comprises expanding the initial corpus of information with a set of documents containing statements with a semantic meaning within a threshold degree of similarity to a semantic meaning of statements contained within the one or more documents used to form the initial corpus of information. The method additionally comprises extracting one or more viewpoints from the expanded corpus of information using a natural language processing technique by identifying subjects discussed in documents of the expanded corpus of information, assertions being made about the subjects and context statements associated with those assertions. Furthermore, the method comprises identifying subject, assertion and context statements from a set of documents. Additionally, the method comprises highlighting assertions in the set of documents that are within a threshold degree of agreement or disagreement with a first viewpoint of the extracted one or more viewpoints and/or are not expressed in the expanded corpus of information using the identified subject, assertion and context assertions from the set of documents.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
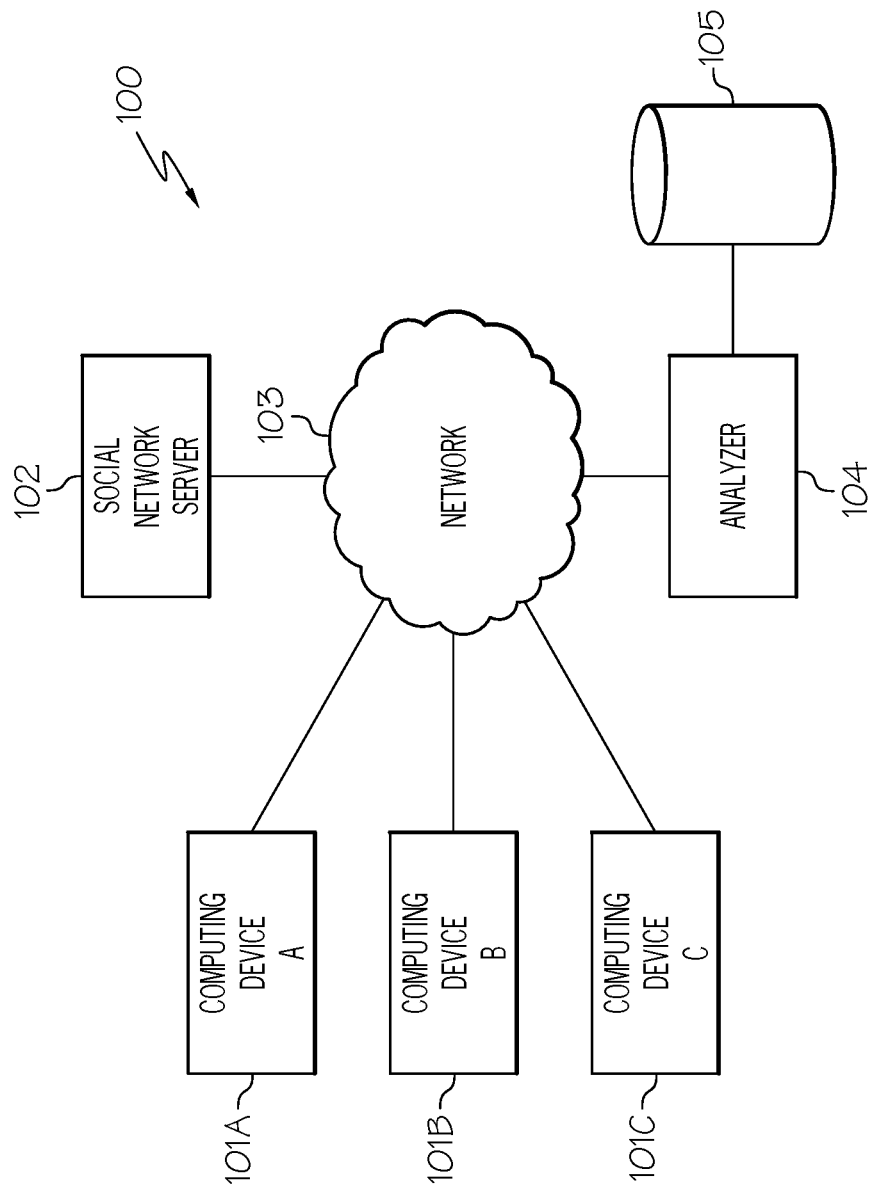
FIG. 1 illustrates a communication system for practicing the principles of the present invention in accordance with an embodiment of the present invention.

The present invention comprises a computer-implemented method, system and computer program product for understanding information using a document analysis technique. In one embodiment of the present invention, an initial corpus of information is formed by identifying a document (s) that match a search criteria. The "initial corpus of information," as used herein, refers to a body of knowledge that is used to establish a viewpoint (school of thought). For example, the initial corpus of information could be a set of papers written by a particular author. The initial corpus of information is expanded with a set of documents containing statements with a semantic meaning within a threshold degree of similarity to a semantic meaning of statements contained within the document(s) used to form the initial corpus of information. Viewpoint(s) are then extracted from the expanded corpus of information using a natural language processing technique by identifying subjects discussed in the documents of the expanded corpus of information, assertions being made about the subjects and context associated with those assertions. "Viewpoint extraction," as used herein, refers to extracting a viewpoint(s) from the expanded corpus of information that are consistently expressed in that corpus. A "viewpoint," as used herein, refers to an object, one or more assertions being made about that object and an optional context. A new set of documents may then be analyzed by identifying the subject, assertion and context statements, which are used to determine the viewpoint of the analyzed documents and the attitude of the writer in expressing such a viewpoint. Assertions (such assertions are based on the extracted viewpoint in light of the attitude of the writer in expressing such a viewpoint) in the new set of documents that are within a threshold degree of agreement or disagreement with the extracted viewpoint (viewpoint extracted from the expanded corpus of information) are highlighted to assist the user in understanding how information aligns with a viewpoint as well as to assist the user in understanding how consistent a given viewpoint is being accepted. Furthermore, assertions in the new set of documents that were not expressed in the corpus of information are also highlighted. As a result, document analysis techniques are improved by enabling users to better understand how information aligns with a viewpoint.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates an embodiment of the present invention of a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a social network server 102 via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and social network server 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Social network server 102, which may be a web server configured to offer a social networking and/or microblogging service, enables users of computing devices 101 to send and read other users' posts. "Posts," as used herein, include any one or more of the following: text (e.g., comments, sub-comments and replies), audio, video images, etc. Social network server 102, as used herein, is configured to enable various collaborative activities, such as online discussion sites (e.g., public forums). Social network server 102 is connected to network 103 by wire or wirelessly. While FIG. 1 illustrates a single social network server 102, it is noted for clarity that multiple servers may be used to implement the social networking and/or microblogging service.

System 100 additionally includes what is referred to herein as an "analyzer" 104 connected to network 103 by wire or wirelessly. Analyzer 104 is configured to analyze documents, including posts, to determine how information discussed in such documents aligns with a viewpoint. "Documents," as used herein, refer to an electronic form of information, including, but not limited to, journals, articles, papers, posts, messages, etc. Such documents may be stored in a database 105 connected to analyzer 104, which may be obtained from the users of computing devices 101 or obtained by searching and identifying publicly available documents on the Internet, such as publicly available social media posts.

As discussed in further detail below, analyzer 104 forms an initial corpus of information by identifying a document(s) that match a search criteria. The initial corpus of information is expanded with a set of documents that have a semantic meaning within a threshold degree of similarity to a semantic meaning of statements contained within the document(s) used to form the initial corpus of information. A viewpoint(s) may then be extracted from the expanded corpus of information, such as by using a natural language processing technique. After extracting the viewpoint(s), analyzer 104 may determine how consistent is the viewpoint expressed in the expanded corpus of information as well as determine how new information from new documents aligns with the viewpoint (e.g., determine the extent that the new information is in agreement with the viewpoint). A further discussion regarding the functionality of analyzer 104 is provided below. Furthermore, a description of the hardware configuration of analyzer 104 is provided below in connection with FIG. 2.

System 100 is not to be limited in scope to any one particular network architecture. System 100 may include any number of computing devices 101, social network servers 102, networks 103, analyzers 104 and databases 105. Furthermore, while FIG. 1 illustrates analyzer 104 as being a separate physical device, some or all of the functionality of analyzer 104 may reside in computing device 101.

Figure 2:
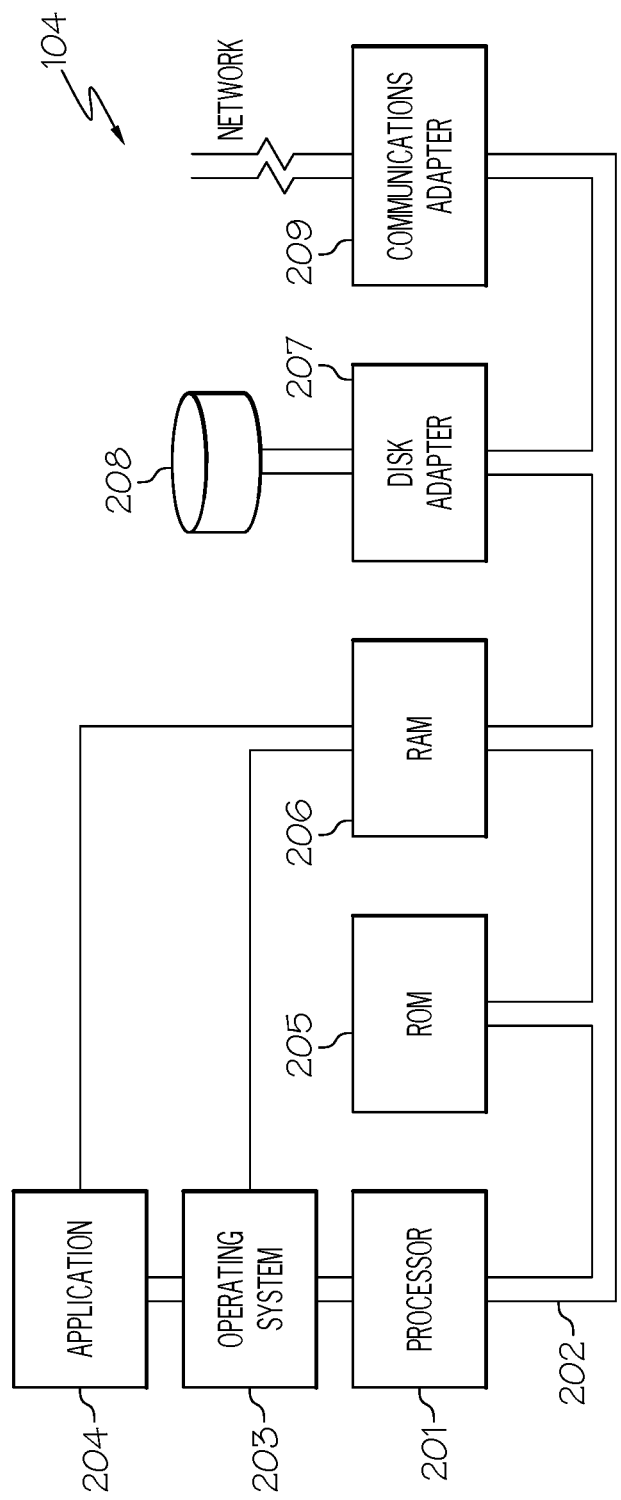
FIG. 2 illustrates an embodiment of the present invention of a hardware configuration of the analyzer which is representative of a hardware environment for practicing the present invention.

Referring now to FIG. 2, FIG. 2 illustrates a hardware configuration of analyzer 104 (FIG. 1) which is representative of a hardware environment for practicing the present invention. Referring to FIG. 2, analyzer 104 has a processor 201 connected to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for determining how information aligns with a viewpoint as discussed below in association with FIG. 3

Referring again to FIG. 2, read-only memory ("ROM") 205 is connected to system bus 202 and includes a basic input/output system ("BIOS") that controls certain basic functions of analyzer 104. Random access memory ("RAM") 206 and disk adapter 207 are also connected to system bus 202. It should be noted that software components including operating system 203 and application 204 may be loaded into RAM 206, which may be analyzer's 104 main memory for execution. Disk adapter 207 may be an integrated drive electronics ("IDE") adapter that communicates with a disk unit 208, e.g., disk drive. It is noted that the program for determining how information aligns with a viewpoint, as discussed below in association with FIG. 3, may reside in disk unit 208 or in application 204.

Analyzer 104 may further include a communications adapter 209 connected to bus 202. Communications adapter 209 interconnects bus 202 with an outside network (e.g., network 103 of FIG. 1) thereby allowing analyzer 104 to communicate with computing devices 101 and social network server 102 as well as to access publicly available documents posted on the Internet.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, oftentimes, people may have different schools of thought concerning an issue, such as which treatment to use to treat a patient, which diet plan to use to lose weight, which approach to solve a technology problem, which materials to use in constructing a garage, etc. A school of thought is the perspective of a group of people who share common characteristics of opinion or outlook of a philosophy, discipline, belief, social movement, economics, cultural movement, art movement, etc. Each of these schools of thought, including contradictory schools of thought, may be valid to the extent that there is no consensus (or limited consensus) as to the correct approach for addressing the issue. For example, there may be multiple schools of thought in how to treat a patient. For instance, there are many approaches, even those that contradict each other, that attempt to treat cancer. For example, some oncologists may subscribe to the school of thought that aggressive chemotherapy/radiation therapy is always better; whereas, other oncologists may subscribe to the school of thought that a more conservative approach using a less aggressive form of treatment to initially treat cancer is better. Individuals may align themselves with a particular viewpoint (school of thought) and would like to check the validity of information based on such a viewpoint. For example, there are leading doctors who treat squamous cell lung cancer in a particular way. A physician may subscribe to one approach to treat squamous cell lung cancer based on research published by a particular doctor. As new information (e.g., new documents) becomes available about treating this type of lung cancer, the physician may want to see how the new information aligns with the physician's preferred expert's position. Currently, document analysis techniques are limited to fact checking. In such techniques, statements in documents are compared against a generally agreed upon truth in order to determine the veracity or correctness of the statements. Unfortunately, such document analysis techniques do not analyze documents for determining how information in the documents aligns with a particular viewpoint. That is, there is not currently a means for determining how information aligns with a viewpoint (school of thought).

The embodiments of the present invention provide a means for determining how information aligns with a viewpoint (school of thought) by forming a corpus of information, expanding the formed corpus of information, extracting a viewpoint from the expanded corpus of information and then determining how new information from new documents aligns with the extracted viewpoint as discussed below in connection with FIG. 3.

Figure 3:
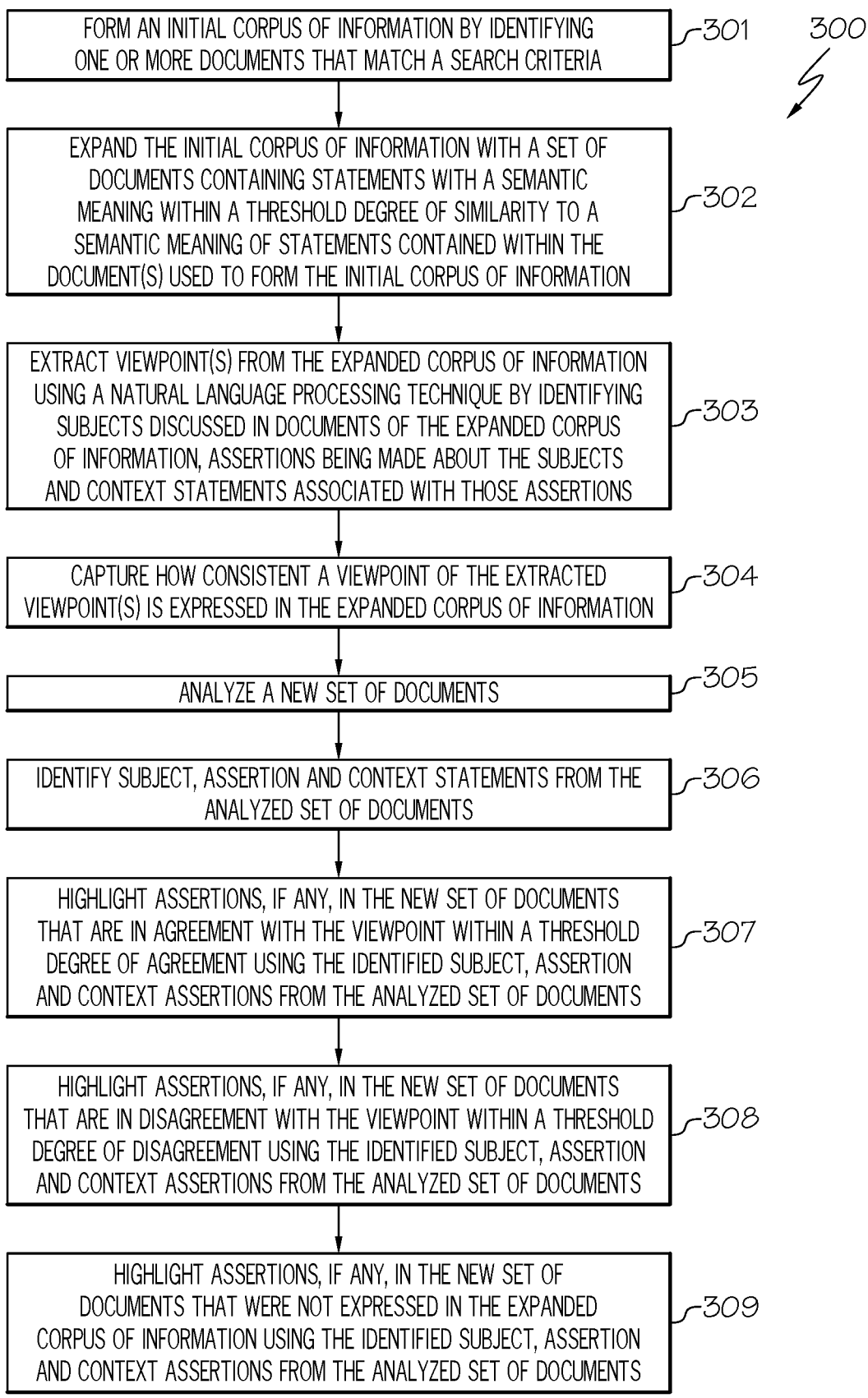
FIG. 3 is a flowchart of a method for determining how information aligns with a viewpoint in accordance with an embodiment of the present invention.

FIG. 3 is a flowchart of a method 300 for determining how information aligns with a viewpoint in accordance with an embodiment of the present invention.

Referring to FIG. 3, in conjunction with FIGS. 1-2, in step 301, analyzer 104 forms an initial corpus of information by identifying one or more documents that match a search criteria (e.g., all documents written by a certain author, all documents provided solely by a particular user, documents directed to a designated issue in a particular journal). The "initial corpus of information," as used herein, refers to a body of knowledge that is used to establish a viewpoint (school of thought). For example, the initial corpus of information could be a set of papers written by a particular author. For instance, a set of journal articles published by a particular physician could serve as the seed or basis for establishing a particular viewpoint.

In one embodiment, the initial corpus of information is established by having a user (e.g., user of computing device 101A) provide the name of an individual to analyzer 104, such as an author of several articles. Analyzer 104 may then search and identify publicly available articles, such as on the Internet, authored by the name of the individual provided by the user. In such an embodiment, analyzer 104 may utilize natural language processing to identify articles published by an author that matches the name of the individual provided by the user. In one embodiment, the user (e.g., user of computing device 101A) may provide the name of the individual to analyzer 104 via a user interface on computing device 101.

Furthermore, in one embodiment, the initial corpus of information may be established by having a user (e.g., user of computing device 101A) provide the title of a journal or an article to analyzer 104. Analyzer 104 may then search and identify the journal or article, such as on the Internet, if it is publicly available. In such an embodiment, analyzer 104 may utilize natural language processing to identify the journal or article that matches the title of the journal or article provided by the user.

Additionally, in one embodiment, the user (e.g., user of computing device 101) may provide the documents (e.g., articles, papers, etc.) that are to be used to form the initial corpus of information.

In one embodiment, the documents used to form the initial corpus of information are stored in database 105.

In step 302, analyzer 104, optionally, expands the initial corpus of information with a set of documents containing statements with a semantic meaning within a threshold degree of similarity to a semantic meaning of statements contained within the document(s) used to form the initial corpus of information. "Semantic meaning," as used herein, refers to both the literal or connotative meaning of the statement. While the following discusses the present invention in connection with expanding the initial corpus of information, it is noted that the principles of the present invention are not limited to such an embodiment. Instead, the present invention may simply extract viewpoint(s) (discussed further below) from the initially formed corpus of information as opposed to extracting the viewpoint(s) from the expanded corpus of information.

In one embodiment, the document(s) used to form the initial corpus of information are analyzed by analyzer 104 to determine the semantic meaning of statements contained within the documents using semantic analysis as discussed further below. Analyzer 104 may then search and identify other documents, such as those publicly available on the Internet, containing statements with a semantic meaning within a threshold degree of similarity to the semantic meaning of the statements contained within the document(s) used to form the initial corpus of information. Alternatively, analyzer 104 may receive documents from the user to analyze to determine if such documents contain statements with a semantic meaning within a threshold degree of similarity to the semantic meaning of the statements contained within the document(s) used to form the initial corpus of information.

In one embodiment, analyzer 104 builds upon the initial corpus of information by locating other documents that are likely to express a consistent viewpoint that was established by the initial corpus of information.

For example, in one embodiment, analyzer 104 extracts and catalogs a set of statements found in a document (e.g., publication) used in the initial corpus of information. Analyzer 104 may then search and identify other documents, such as those publicly available on the Internet, expressing the same or similar statements using natural language processing. Alternatively, analyzer 104 may receive documents from the user to analyze to determine if such documents contain the same or similar cataloged statements used in the initial corpus of information.

For example, such extracted statements found in a document used in the initial corpus of information may correspond to terms or phrases (e.g., "Nivolumab," "PD-L1 positive," "effective treatment") which are used as keywords to locate other documents containing the same or similar keywords. Alternatively, analyzer 104 may search and identify other documents that contain statements with a semantic meaning within a threshold degree of similarity to a cataloged statement using semantic analysis. "Semantic analysis," as used herein, refers to knowing what the collection of words actually means using natural language processing. For example, in one embodiment, a sentence may be parsed and labeled various parts of speech. Parts of speech referring to an entity may be identified and linked to pronouns appearing later in the text. Text may be processed to produce a single embedding for individual words in the form of an n-dimensional vector, such as using Word2Vec. A similarity (e.g., cosine similarity) may then be measured between the vectors for certain words to analyze how they are related. Additionally, in one embodiment, lemmatization may be used to reduce many forms of words to their base forms (e.g., tracking, tracked and tracker reduced to the base form of track) to identify words used more regularly and avoiding considering verb conjugations as separate words.

The "degree of similarity" (also referred to as the "degree of semantic similarity"), as used herein, refers to a metric defined over a set of documents or terms, where the idea of distance between them is based on the likeness of their meaning or semantic content as opposed to similarity which can be estimated regarding their syntactical representation (e.g., their string format). The "threshold degree of similarity," as used herein, refers to the required degree of similarity between statements in the newly discovered/identified/received documents and the statements contained in the documents used to form the initial corpus of information in order to conclude that such newly discovered/identified/received documents should be included with the initial corpus of information. In one embodiment, the threshold degree of similarity is user-specified.

In one embodiment, a word embedding oriented technique is utilized, where passages are represented as vectors in n-dimensional space. Similar documents (e.g., publications) may then be identified based on how close they are grouped to such passages in the n-dimensional space. For example, passages in the document(s) used to form the initial corpus of information are represented as vectors in n-dimensional space. Passages in the newly discovered/identified/received documents, as discussed above, are also represented as vectors in n-dimensional space. Those documents of the newly discovered/identified/received documents that are represented by vectors within a threshold degree of closeness to the vectors of the document(s) used to form the initial corpus of information are selected to expand the initial corpus of information. The "threshold degree of closeness," as used herein, refers to a particular distance between the vectors, where the distance may be user-specified. As a result, those newly discovered/identified/received documents, whose passages are represented as vectors that are within a threshold degree of closeness to a vector of a document used to form the initial corpus of information, are selected to expand the initial corpus of information.

In one embodiment, a rules-based approach using metadata associated with the document(s) used to form the initial corpus of information is employed to identify the document(s) to expand the initial corpus of information. For example, metadata (e.g., name of author, name of journal) associated with a publication used to form the initial corpus of information may be used to identify other publications to expand the initial corpus of information, such as other publications written by the same author or other publications published by the same journal, etc.

In step 303, analyzer 104 extracts the viewpoint(s) from the expanded corpus of information using a natural language processing technique by identifying subjects discussed in the documents of the expanded corpus of information, assertions being made about the subjects and context (context statements) associated with those assertions.

"Viewpoint extraction," as used herein, refers to extracting a viewpoint(s) from the expanded corpus of information that are consistently expressed in that corpus. A "viewpoint," as used herein, refers to an object, one or more assertions being made about that object and an optional context. For example, in the statement "Nivolumab is an effective treatment for NSCLC patients that are PD-L1 positive," analyzer 104 would capture a viewpoint pertaining to a lung cancer treatment option, Nivolumab, where the assertion is made about it being an effective treatment in the context of non-small cell lung cancer patients that are PD-L1 positive. It is noted that a given corpus could include conflicting viewpoints. Hence, viewpoint extraction not only captures the viewpoints expressed but also a measure of the consistency in which they are expressed.

In one embodiment, a viewpoint, as discussed herein, may consist of a set of opinions. In one embodiment, a viewpoint, as discussed herein, may consist of a set of facts. In one embodiment, a viewpoint, as discussed herein, may consist of both facts and opinions. In such an embodiment, the assertions extracted from the corpus of information may consist of both factual assertions and assertions of opinion.

As discussed above, in one embodiment, viewpoint(s) are extracted from the expanded corpus of information utilizing a natural language processing based algorithm. In one embodiment, such a technique utilizes parts of speech tagging to identify the various subjects mentioned in a document (e.g., publication), assertions being made about those objects and the context associated with those assertions. In one embodiment, analyzer 104 utilizes concept disambiguation to ensure the accurate interpretation of each subject based on the surrounding sentence and context (e.g., is the reference to "ice" referring to water in its frozen state or to a drug regimen).

Furthermore, in one embodiment, negation and hypothetical identification and screening can be used to limit the extracted material to the assertions being made in a given document.

In one embodiment, viewpoint extraction includes algorithms to deal with conflicting assertions thereby establishing a level of confidence in a given assertion based on how often and how consistent it was expressed in the expanded corpus of information. "Level of confidence," as used herein, refers to the degree that the assertion is positively confirmed. In one embodiment, context statements associated with the assertions are used to determine a semantic meaning of the assertions establishing a level of confidence in the assertion based on the frequency of the assertion being made in the expanded corpus of information and how consistent it was expressed in the expanded corpus of information.

As a result of viewpoint extraction, a knowledge base of subjects, assertions being made about each subject and the context in which those assertions were made are obtained.

An example of a viewpoint extraction process is provided below.

Suppose that a document of the expanded corpus of information contains the following statement: "Afatinib significantly improved outcomes in treatment-naive patients with EGFR-mutated NSCLC compared with gefitinib."

In one embodiment, a part of speech analysis is performed by analyzer 104 that extracts the following information from this statement:

Afatinib is the subject about which an assertion is being made;
Verb/adverb combinations would be the triggers used to identify assertions being made about the subject (e.g., "significantly improved outcomes," "compared with gefitinib")
Prepositional phrases would identify context information to capture from the statement (e.g., "treatment-naive patients" and "EGFR (epidermal growth factor receptor)-mutated NSCLC (non-small cell lung cancer)."

In one embodiment, in connection with viewpoint extraction, analyzer 104 aggregates and summarizes the viewpoints expressed in the corpora used to establish a particular viewpoint. In one embodiment, the summarization process captures how consistent a given viewpoint is expressed in the collection of documents (e.g., what percentage of the time are the statements "afatinib" and "improved outcomes" used in the same context, such as for untreated EGFR-mutated NSCLC patients).

In step 304, analyzer 104 captures how consistent a viewpoint of the extracted viewpoint(s) is expressed in the expanded corpus of information as discussed above. In one embodiment, analyzer 104 utilizes sentiment analysis to determine the attitude of the author in expressing such a viewpoint. Sentiment analysis, as used herein, refers to the use of natural language processing, text analysis, computational linguistics, and biometrics to systematically identify, extract, quantify, and study affective states and subjective information. For example, natural language processing may be used to determine the attitude of the writer in expressing a viewpoint. Such attitudes may be determined based on the types of words (e.g., "successful," "unsuccessful," "effective treatment," "ineffective treatment") detected by analyzer 104 when analyzing the texts of the documents in the expanded corpus of information utilizing natural language processing. For example, if analyzer 104 consistently identifies positive terms, such as "effective" and "successful" in connection with afatinib being an effective treatment for patients with EGFR-mutated NSCLC, then it may be deemed that the viewpoint of afatinib being an effective treatment for patients with EGFR-mutated NSCLC is confirmed. Alternatively, in another example, if terms, such as "ineffective" and "unsuccessful" were used in connection with afatinib being used to treat patients with EGFR-mutated NSCLC, then it may be deemed that the viewpoint of afatinib being an effective treatment for patients with EGFR-mutated NSCLC is not entirely consistent.

In one embodiment, analyzer 104 may tabulate the number of statements that provide support as well as those that provide disagreement with a viewpoint. Based on a ratio of statements that provide agreement versus those that provide disagreement with a viewpoint, analyzer 104 may provide to the user of analyzer 104 an indication of how consistent a viewpoint of the extracted viewpoint(s) is expressed in the expanded corpus of information.

In step 305, analyzer 104 analyzes a new set of documents. Such new documents may be received from the user (e.g., user of computing device 101) in a similar manner as discussed above in connection with steps 301 and 302 or identified by analyzer 104, such as on the Internet, as being likely to express a consistent/inconsistent viewpoint that was established by the expanded corpus of information.

For example, in one embodiment, if the viewpoint of the corpus of information was directed to the school of thought that the gluten free diet is a good diet for alleviating fatigue, then analyzer 104 may search and identify for publicly available documents on the Internet directed to the aspects of "gluten free diet" and "fatigue" using natural language processing. For instance, analyzer 104 may identify newly published documents on the Internet that contain such keywords.

In step 306, analyzer 104 identifies the subject, assertion and context statements from the analyzed set of documents, such as by utilizing the parts of speech analysis as discussed above. As discussed above, by identifying the subject, assertion and context statements, a particular viewpoint may be extracted. As a result, analyzer 104 will be able to determine how consistent or inconsistent the assertions being made in the analyzed documents (such assertions are based on the extracted viewpoint in light of the attitude of the writer in expressing such a viewpoint as discussed below) are to the viewpoint expressed in the expanded corpus of information.

In step 307, analyzer 104 highlights the assertions, if any, in the analyzed set of documents that are in agreement with the viewpoint within a threshold degree of agreement using the identified subject, assertion and context assertions from the analyzed set of documents. In one embodiment, analyzer 104 determines which assertions are in agreement with the viewpoint (viewpoint of the expanded corpus of information) using the natural language processing based algorithm discussed above (utilizes parts of speech tagging) and sentiment analysis. For example, natural language processing may be used to determine the viewpoint of the analyzed documents and the attitude of the writer in expressing such a viewpoint. Such attitudes may be determined based on the types of words (e.g., "successful," "effective treatment") detected by analyzer 104 when analyzing the texts of the new set of documents utilizing natural language processing. Such words may indicate an agreement with the viewpoint, such as "successful" and "effective." Statements containing such words may then be identified and highlighted by analyzer 104.

Furthermore, the "threshold degree of agreement," as used herein in connection with an agreement with the viewpoint, refers to the required degree of agreement the assertions in the analyzed set of documents need to have with the viewpoint in order to be considered in agreement with the viewpoint. Such a degree is determined based on the type of words (e.g., "successful," "fair") utilized in connection with the viewpoint. In one embodiment, the threshold is user-selected.

In step 308, analyzer 104 highlights the assertions, if any, in the analyzed set of documents that are in disagreement with the viewpoint within a threshold degree of disagreement using the identified subject, assertion and context assertions from the analyzed set of documents. In one embodiment, analyzer 104 determines which assertions are in disagreement with the viewpoint (viewpoint of the expanded corpus of information) using the natural language processing based algorithm discussed above (utilizes parts of speech tagging) and sentiment analysis. For example, natural language processing may be used to determine the viewpoint of the analyzed documents and the attitude of the writer in expressing such a viewpoint. Such attitudes may be determined based on the types of words (e.g., "unsuccessful," "ineffective treatment") detected by analyzer 104 when analyzing the texts of the new set of documents utilizing natural language processing. Such words may indicate a disagreement with the viewpoint, such as "unsuccessful" and "ineffective." Statements containing such words may then be identified and highlighted by analyzer 104.

Furthermore, the "threshold degree of disagreement," as used herein in connection with a disagreement with the viewpoint, refers to the required degree of disagreement the assertions in the analyzed set of documents need to have with the viewpoint in order to be considered to be in disagreement with the viewpoint. Such a degree is determined based on the type of words (e.g., "unsuccessful," "fair") utilized in connection with the viewpoint. In one embodiment, the threshold is user-selected.

In step 309, analyzer 104 highlights the assertions, if any, in the analyzed set of documents that were not expressed in the expanded corpus of information using the identified subject, assertion and context assertions from the analyzed set of documents. For example, suppose that the viewpoint of the corpus of information relates to the gluten free diet being a good diet for alleviating fatigue. Analyzer 104 may identify and highlight the assertion that the gluten free diet is also good for alleviating headaches, including migraines, as well.

In one embodiment, "highlighting," as discussed above, refers to emphasizing or making prominent the statements in the analyzed set of documents. In one embodiment, highlighting may include italicizing, bolding, changing the font size, etc. of those statements in the analyzed documents that are to be emphasized. The principles of the present invention are to include other means of highlighting and are not to be limited in scope to the examples discussed above.

As a result of highlighting assertions that are in agreement and/or disagreement with the viewpoint within a threshold degree of agreement and/or disagreement, respectively, as well as highlighting those assertions that were not expressed in the expanded corpus of information, a user is able to deduce how new information aligns with a viewpoint.

Furthermore, in one embodiment, analyzer 104 continuously expands the corpus of information. For example, over time, the corpus of documents may change as new publications become available. For instance, the corpus may change in response to adjusting the authors/organizations whose content should be part of the corpus. In another example, the existing authors/organizations that contribute to the corpus could publish new documents. For instance, new experience with a cancer treatment may lead to new publications by an author whose viewpoint is the one that the user subscribes. This new publication may be considered as current evidence in that school of thought. It might confirm the previous treatment recommendation with additional evidence, or it might even change the treatment recommendation based on new information. In the field of medicine, as in many fields, new information is being discovered all the time, and new publications can be weighted higher than older publications that may have had more limited data.

Another aspect of changes over time is that there may be multiple schools of thought that begin to converge or diverge over time. Such an aspect may be observed by analyzer 104 identifying the level of concordance/discordance over time. "Concordance," as used herein, refers to agreement with the viewpoint and "discordance," as used herein, refers to disagreement with the viewpoint. For instance, in medicine, it may become clear over time that one school of thought has clear promise (or clear disadvantages). In that case, two or more competing schools of thought might actually converge over time to a single approach. For example, the user may be following the school of thought that ends up being the de facto approach over a second approach. While the user may have disagreed with the second approach, the user may still be interested to read and understand how the second approach applies to patient cases. Over time with more research, the second approach actually changes direction and begins to advocate for what the user's school of thought is advocating. As a result, the user would be provided additional confidence that not only is the user's school of thought becoming the de facto approach but that other approaches have changed and now agreed with the same approach subscribed by the user.

In the manner discussed above, the embodiments of the present invention are able to provide the means for enabling users to determine how information aligns with a viewpoint (school of thought).

Furthermore, the present invention improves the technology or technical field involving document analysis.

As discussed above, oftentimes, people may have different schools of thought concerning an issue, such as which treatment to use to treat a patient, which diet plan to use to lose weight, which approach to solve a technology problem, which materials to use in constructing a garage, etc. A school of thought is the perspective of a group of people who share common characteristics of opinion or outlook of a philosophy, discipline, belief, social movement, economics, cultural movement, art movement, etc. Each of these schools of thought, including contradictory schools of thought, may be valid to the extent that there is no consensus (or limited consensus) as to the correct approach for addressing the issue. For example, there may be multiple schools of thought in how to treat a patient. For instance, there are many approaches, even those that contradict each other, that attempt to treat cancer. For example, some oncologists may subscribe to the school of thought that aggressive chemotherapy/radiation therapy is always better; whereas, other oncologists may subscribe to the school of thought that a more conservative approach using a less aggressive form of treatment to initially treat cancer is better. Individuals may align themselves with a particular viewpoint (school of thought) and would like to check the validity of information based on such a viewpoint. For example, there are leading doctors who treat squamous cell lung cancer in a particular way. A physician may subscribe to one approach to treat squamous cell lung cancer based on research published by a particular doctor. As new information (e.g., new documents) becomes available about treating this type of lung cancer, the physician may want to see how the new information aligns with the physician's preferred expert's position. Currently, document analysis techniques are limited to fact checking. In such techniques, statements in documents are compared against a generally agreed upon truth in order to determine the veracity or correctness of the statements. Unfortunately, such document analysis techniques do not analyze documents for determining how information in the documents aligns with a particular viewpoint. That is, there is not currently a means for determining how information aligns with a viewpoint (school of thought).

The present invention improves such technology by establishing a corpus of information with documents that match a search criteria. Viewpoint(s) are then extracted from the corpus of information using a natural language processing technique by identifying subjects discussed in the documents of the corpus of information, assertions being made about the subjects and the context associated with those assertions. A new set of documents may then be analyzed by identifying the subject, assertion and context statements. Assertions in the new set of documents that are within a threshold degree of agreement or disagreement with the extracted viewpoint are highlighted to assist the user in understanding how information aligns with a viewpoint as well as to assist the user in understanding how consistent a given viewpoint is being accepted. Furthermore, assertions in the new set of documents that were not expressed in the corpus of information are also highlighted. As a result, document analysis techniques are improved by enabling users to better understand how information aligns with a viewpoint. In this manner, there is an improvement in the technical field involving document analysis.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for understanding information using a document analysis technique, the method comprising:
    forming an initial corpus of information by identifying one or more documents that match a search criteria, wherein said search criteria comprises one or more of the following: an author, documents provided by a particular user and a designated issue;
    expanding said initial corpus of information with a first set of documents containing statements with a semantic meaning within a threshold degree of similarity to a semantic meaning of statements contained within said one or more documents of said initial corpus of information to form an expanded corpus of information;
    extracting one or more viewpoints from said expanded corpus of information using a natural language processing technique by identifying subjects discussed in documents of said expanded corpus of information, assertions being made about said subjects and context statements associated with those assertions, wherein said one or more viewpoints are directed to one or more schools of thought, wherein said subjects correspond to what or whom a sentence is all about, wherein said assertions correspond to statements of fact or belief, wherein said context statements correspond to statements concerning context associated with said assertions;
    identifying subject, assertion and context statements from a second set of documents; and
    highlighting assertions in said second set of documents that are within a threshold degree of agreement or disagreement with a first viewpoint of said extracted one or more viewpoints and/or are not expressed in said expanded corpus of information using said identified subject, assertion and context assertions from said second set of documents.

2. The method as recited in claim 1 further comprising:
    capturing how consistent said first viewpoint is expressed in said expanded corpus of information.

3. The method as recited in claim 1 further comprising:
    extracting and cataloging a set of statements found in said one or more documents used to form said initial corpus of information; and
    identifying said set of documents to expand said initial corpus of information that contain statements with a semantic meaning within a threshold degree of similarity to one or more cataloged statements.

4. The method as recited in claim 1 further comprising:
    analyzing documents to determine a semantic meaning of statements contained within said analyzed documents; and
    identifying said set of documents within said analyzed documents that contain statements with said semantic meaning within said threshold degree of similarity to said semantic meaning of statements contained within said one or more documents used to form said initial corpus of information.

5. The method as recited in claim 1 further comprising:
    representing passages in said one or more documents used to form said initial corpus of information as vectors in n-dimensional space;
    representing passages in a new set of documents as vectors in n-dimensional space; and
    identifying said set of documents within said new set of documents to expand said initial corpus of information that are represented by vectors that are within a threshold degree of closeness to vectors of said one or more documents used to form said initial corpus of information in n-dimensional space.

6. The method as recited in claim 1 further comprising:
    employing a rules-based approach using metadata associated with said one or more documents used to form said initial corpus of information to identify said set of documents to expand said initial corpus of information.

7. The method as recited in claim 1, wherein said natural language processing technique utilizes parts of speech tagging.

8. The method as recited in claim 1, wherein said context statements associated with said assertions that were identified in documents of said expanded corpus of information are used to determine a semantic meaning of said assertions establishing a level of confidence in a first assertion based on a frequency of said first assertion being made in said expanded corpus of information and how consistent it was expressed in said expanded corpus of information.

9. A computer program product for understanding information using a document analysis technique, the computer program product comprising a computer readable storage medium having program code embodied therewith, the program code comprising the programming instructions for:

forming an initial corpus of information, wherein said initial corpus of information is established by identifying one or more documents that match a search criteria, wherein said search criteria comprises one or more of the following: an author, documents provided by a particular user and a designated issue;

expanding said initial corpus of information with a first set of documents containing statements with a semantic meaning within a threshold degree of similarity to a semantic meaning of statements contained within said one or more documents of said initial corpus of information used to form said initial corpus of information an expanded corpus of information;

extracting one or more viewpoints from said expanded corpus of information using a natural language processing technique by identifying subjects discussed in documents of said expanded corpus of information, assertions being made about said subjects and context statements associated with those assertions, wherein said one or more viewpoints are directed to one or more schools of thought, wherein said subjects correspond to what or whom a sentence is all about, wherein said assertions correspond to statements of fact or belief, wherein said context statements correspond to statements concerning context associated with said assertions;

identifying subject, assertion and context statements from a second set of documents; and highlighting assertions in said second set of documents that are within a threshold degree of agreement or disagreement with a first viewpoint of said extracted one or more viewpoints and/or are not expressed in said expanded corpus of information using said identified subject, assertion and context assertions from said second set of documents.

10. The computer program product as recited in claim 9, wherein the program code further comprises the programming instructions for:

capturing how consistent said first viewpoint is expressed in said expanded corpus of information.

11. The computer program product as recited in claim 9, wherein the program code further comprises the programming instructions for:

extracting and cataloging a set of statements found in said one or more documents used to form said initial corpus of information; and identifying said set of documents to expand said initial corpus of information that contain statements with a semantic meaning within a threshold degree of similarity to one or more cataloged statements.

12. The computer program product as recited in claim 9, wherein the program code further comprises the programming instructions for:

analyzing documents to determine a semantic meaning of statements contained within said analyzed documents; and identifying said set of documents within said analyzed documents that contain statements with said semantic meaning within said threshold degree of similarity to said semantic meaning of statements contained within said one or more documents used to form said initial corpus of information.

13. The computer program product as recited in claim 9, wherein the program code further comprises the programming instructions for:

representing passages in said one or more documents used to form said initial corpus of information as vectors in n-dimensional space;

representing passages in a new set of documents as vectors in n-dimensional space; and identifying said set of documents within said new set of documents to expand said initial corpus of information that are represented by vectors that are within a threshold degree of closeness to vectors of said one or more documents used to form said initial corpus of information in n-dimensional space.

14. The computer program product as recited in claim 9, wherein the program code further comprises the programming instructions for:

employing a rules-based approach using metadata associated with said one or more documents used to form said initial corpus of information to identify said set of documents to expand said initial corpus of information.

15. The computer program product as recited in claim 9, wherein said natural language processing technique utilizes parts of speech tagging.

16. The computer program product as recited in claim 9, wherein said context statements associated with said assertions that were identified in documents of said expanded corpus of information are used to determine a semantic meaning of said assertions establishing a level of confidence in a first assertion based on a frequency of said first assertion being made in said expanded corpus of information and how consistent it was expressed in said expanded corpus of information.

17. A system, comprising:

a memory for storing a computer program for understanding information using a document analysis technique; and a processor connected to the memory, wherein the processor is configured to execute the program instructions of the computer program comprising:

forming an initial corpus of information, wherein said initial corpus of information is established by identifying one or more documents that match a search criteria, wherein said search criteria comprises one or more of the following: an author, documents provided by a particular user and a designated issue;

expanding said initial corpus of information with a first set of documents containing statements with a semantic meaning within a threshold degree of similarity to a semantic meaning of statements contained within said one or more documents of said initial corpus of information used to form said initial corpus of information an expanded corpus of information;

extracting one or more viewpoints from said expanded corpus of information using a natural language processing technique by identifying subjects discussed in documents of said expanded corpus of information, assertions being made about said subjects and context statements associated with those assertions, wherein said one or more viewpoints are directed to one or more schools of thought, wherein said subjects correspond to what or whom a sentence is all about, wherein said assertions correspond to statements of fact or belief, wherein said context statements correspond to statements concerning context associated with said assertions;

identifying subject, assertion and context statements from a second set of documents; and highlighting assertions in said second set of documents that are within a threshold degree of agreement or disagreement with a first viewpoint of said extracted one or more viewpoints and/or are not expressed in said expanded corpus of information using said identified subject, assertion and context assertions from said second set of documents.

18. The system as recited in claim 17, wherein the program instructions of the computer program further comprise:

capturing how consistent said first viewpoint is expressed in said expanded corpus of information.

19. The system as recited in claim 17, wherein the program instructions of the computer program further comprise:

extracting and cataloging a set of statements found in said one or more documents used to form said initial corpus of information; and identifying said set of documents to expand said initial corpus of information that contain statements with a semantic meaning within a threshold degree of similarity to one or more cataloged statements.

20. The system as recited in claim 17, wherein the program instructions of the computer program further comprise:

analyzing documents to determine a semantic meaning of statements contained within said analyzed documents; and identifying said set of documents within said analyzed documents that contain statements with said semantic meaning within said threshold degree of similarity to said semantic meaning of statements contained within said one or more documents used to form said initial corpus of information.

\* \* \* \* \*